(12) United States Patent
Chai et al.

(10) Patent No.: US 8,514,224 B2
(45) Date of Patent: Aug. 20, 2013

(54) THREE-DIMENSIONAL MODELING APPARATUS AND METHOD USING GRID STRUCTURE

(75) Inventors: Young-Ho Chai, Gyeonggi-do (KR); Sang-Hun Nam, Seoul (KR)

(73) Assignee: Chung-Ang University Industry Academy Cooperation Foundation, Seoul (KR)

( * ) Notice: Subject to any disclaimer, the term of this patent is extended or adjusted under 35 U.S.C. 154(b) by 837 days.

(21) Appl. No.: 12/615,580

(22) Filed: Nov. 10, 2009

(65) Prior Publication Data

US 2010/0295849 A1    Nov. 25, 2010

(30) Foreign Application Priority Data

May 20, 2009 (KR) ........................ 10-2009-0044144

(51) Int. Cl.
*G06T 17/00* (2006.01)
*G06T 15/10* (2011.01)
*G06T 11/20* (2006.01)
*G09G 5/00* (2006.01)
*G06K 9/32* (2006.01)

(52) U.S. Cl.
USPC ........... 345/420; 345/427; 345/443; 345/630; 345/156; 382/295

(58) Field of Classification Search
USPC ................. 345/581–586, 418–428, 441–443, 345/467–469, 619, 629–630, 644, 650, 672–673, 345/679, 689, 156, 168, 501, 530; 382/276, 382/282, 285, 293–295, 300, 305; 348/576, 348/580
See application file for complete search history.

(56) References Cited

U.S. PATENT DOCUMENTS

| | | | | |
|---|---|---|---|---|
| 5,448,686 A | * | 9/1995 | Borrel et al. | 345/420 |
| 6,483,499 B1 | * | 11/2002 | Li et al. | 345/179 |
| 2005/0116949 A1 | * | 6/2005 | Hoppe | 345/423 |
| 2006/0082571 A1 | * | 4/2006 | McDaniel | 345/419 |
| 2006/0290695 A1 | * | 12/2006 | Salomie | 345/420 |

* cited by examiner

*Primary Examiner* — Wesner Sajous
*Assistant Examiner* — Andrew Shin
(74) *Attorney, Agent, or Firm* — Ladas & Parry LLP

(57) ABSTRACT

Three-dimensional modeling apparatus and method, the three-dimensional modeling apparatus including: an input curved surface; an input point arrangement unit; a representative point determining unit; a polygon generating unit; a curved surface model generating unit; and a curved surface model combining unit. A plurality of curved surface models is combined with one another to generate a three-dimensional image so that a three-dimensional shape that is similar to an actual shape of an object to be modeled may be easily generated.

20 Claims, 18 Drawing Sheets

(a)

(b)

(c)

(d)

C1    C2    C3

C4    C5    C6    C7    C8

C9

C10  C11

C12

A1  A2  A3  A4  A5

(a)  (b)

(c)  (d)

(a)          (b)          (c)

(a)            (b)            (c)

THREE-DIMENSIONAL MODELING APPARATUS AND METHOD USING GRID STRUCTURE

CROSS-REFERENCE TO RELATED PATENT APPLICATION

This application claims the benefit of Korean Patent Application No. 10-2009-0044144, filed on May 20, 2009, in the Korean Intellectual Property Office, the disclosure of which is incorporated herein in its entirety by reference.

BACKGROUND OF THE INVENTION

1. Field of the Invention

The present invention relates to a three-dimensional modeling apparatus and method using a grid structure, and more particularly, to a three-dimensional modeling apparatus and method by which a three-dimensional image having a similar shape to that of an actual object is formed in coordinate space formed of a grid structure.

2. Description of the Related Art

Three-dimensional modeling is generating of a three-dimensional image by using several input devices. In general, in order to digitize a shape generated through a plot as a three-dimensional image, the shape is sketched in a two-dimensional form from several points of view and then is generated as three-dimensional data based on the sketch by using various modeling tools. In this procedure, a different shape from a desired shape may be set. Thus, various studies for easily performing three-dimensional modeling without using sketches and complicated three-dimensional modeling tools have been made.

First, a technology for automating a two-dimensional sketch as a three-dimensional model has been developed. In the technology, an image of a finished two-dimensional sketch model that is shown in a drawing is divided into lines and dots, and faces are recognized using geometric information so that the three-dimensional model can be generated. When the technology is used, the image of the two-dimensional sketch model having a simple shape is easily converted into the three-dimensional model. However, it is not easy to represent a hidden portion of a model or a model having a hole in a two-dimensional sketch. There is also a technology for generating a three-dimensional model by differentiating edges and vertexes of the three-dimensional model by using trajectory information about a two-dimensional input device and additional information about a variation of speed and angle of the two-dimensional input device when a sketch is made using dots and lines on a two-dimensional plane. However, in these three-dimensional model re-constitution methods, it is not easy to generate a free curved surface. 'Teddy' that is a sketching system for generating a free curved surface analyzes and enlarges a circumferential line of a two-dimensional sketch so as to generate information about a thickness of the two-dimensional sketch, thereby generating a three-dimensional model. However, in a technology for generating three-dimensional data by using a two-dimensional sketch, information not entered is automatically generated, and thus, a three-dimensional model having a different shape from a desired shape may be generated.

In order to overcome the above-described problem, a sketch that is a base for modeling is made in a three-dimensional form. In the method, in order to generate a desired three-dimensional model, a curved surface model is generated and the curved surface is modified by an additional input so that a desired three-dimensional model can be generated. When the three-dimensional input device is used, due to consistency between the input device and the generated model, an intuitive sketch may be made. However, input data of the three-dimensional input device always contains an error of location in a depth direction of the three-dimensional model, due to incorrect recognition of a depth cue. Thus, a method of reducing an input error while using an advantage of the three-dimensional input device is needed.

SUMMARY OF THE INVENTION

The present invention provides a three-dimensional modeling apparatus and method using a grid structure by which a three-dimensional image is formed by combining a plurality of three-dimensional curved surfaces that are sequentially input.

The present invention also provides a computer readable recording medium having recorded thereon a program for executing the three-dimensional modeling method by which a three-dimensional image is formed by combining a plurality of three-dimensional curved surfaces that are sequentially input.

According to an aspect of the present invention, there is provided a three-dimensional modeling apparatus including: an input curved surface generating unit generating a plurality of input curved surfaces each of those is formed of a plurality of input points based on coordinates and a moving direction of an input device that moves in three-dimensional data input space; an input point arrangement unit generating three-dimensional coordinate space that corresponds to the data input space and is formed of a plurality of unit grids, and arranging the input points in each of the unit grids; a representative point determining unit determining a representative point of each of the unit grids based on coordinates of the input points included in each of the unit grids and generating a group of representative points with respect to each of the input curved surfaces; a polygon generating unit selecting a representative point sequentially from representative points as a central representative point and generating polygon sequentially with respect to the selected central representative point by connecting the selected central representative point to auxiliary representative points that are representative points adjacent to the selected central representative point; a curved surface model generating unit generating a curved surface model with respect to each of the groups of representative points by connecting polygons that are generated with respect to the respective representative points; and a curved surface model combining unit combining the curved surface models and adjacent curved surface models that are additionally generated to be adjacent to the curved surface models in the coordinate space to generate a final three-dimensional image.

According to another aspect of the present invention, there is provided a three-dimensional modeling method including: generating a plurality of input curved surfaces each of those is formed of a plurality of input points based on coordinates and a moving direction of an input device that moves in three-dimensional data input space; generating three-dimensional coordinate space that corresponds to the data input space and is formed of a plurality of unit grids, and arranging the input points in each of the unit grids; determining a representative point of each of the unit grids based on coordinates of the input points included in each of the unit grids and generating a group of representative points with respect to each of the input curved surfaces; selecting a representative point sequentially from representative points as a central representative point and generating polygon sequentially with respect to the selected central representative point by connecting the selected central representative point to auxiliary representative points that are representative points adjacent to the selected central representative point; generating a curved surface model with respect to each of the groups of representative points by connecting polygons that are generated with respect to the respective representative points; and combining the curved surface models and adjacent curved surface models that are additionally generated to be adjacent to the curved surface models in the coordinate space to generate a final three-dimensional image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a three-dimensional modelling apparatus and method using a grid structure according to the present invention will be described in detail by explaining exemplary embodiments of the invention with reference to the attached drawings.

Figure 1:
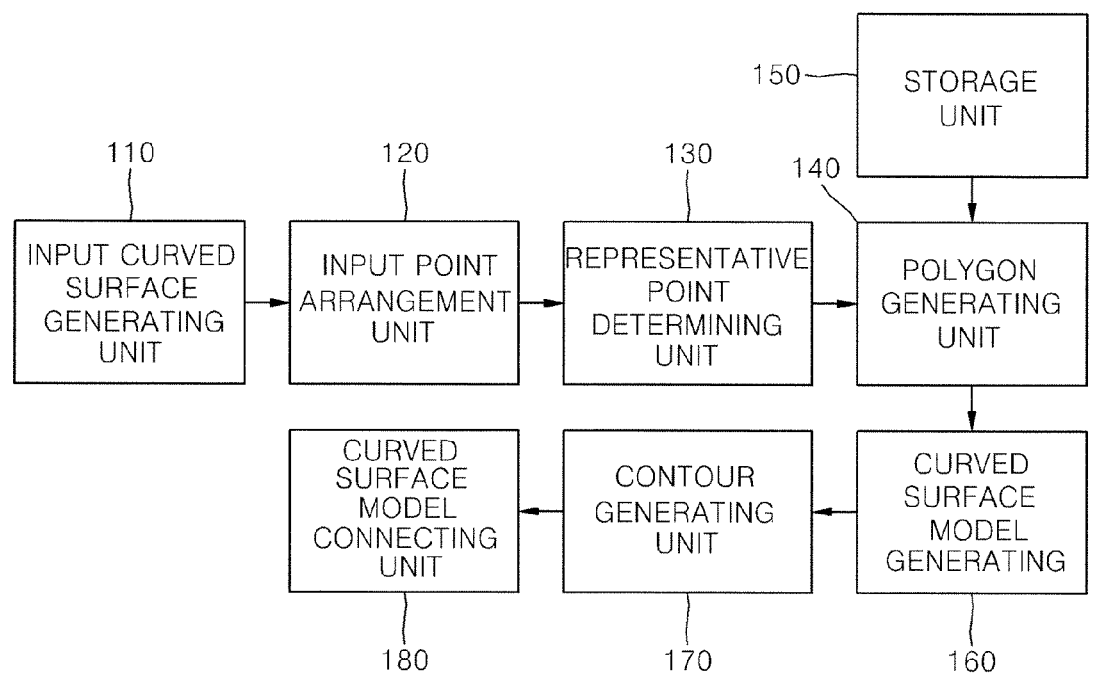
FIG. 1 is a block diagram of a three-dimensional modeling apparatus using a grid structure according to an embodiment of the present invention.

FIG. 1 is a block diagram of a three-dimensional modeling apparatus using a grid structure according to an embodiment of the present invention. Referring to FIG. 1, the three-dimensional modeling apparatus according to the current embodiment of the present invention includes an input curved surface generating unit 110, an input point arrangement unit 120, a representative point determining unit 130, a polygon generating unit 140, a storage unit 150, a curved surface model generating unit 160, a contour generating unit 170, and a curved surface model connecting unit 180.

The input curved surface generating unit 110 generates a plurality of input curved surfaces each of those is formed of a plurality of input points based on coordinates and a moving direction of an input device that moves in three-dimensional data input space.

Figure 2:
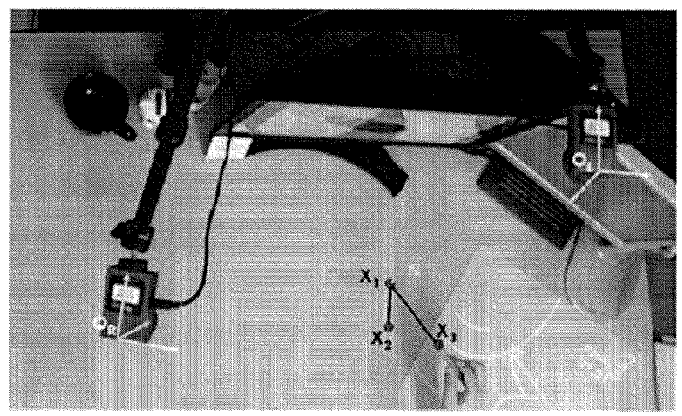
FIG. 2 is a photo showing a wand that includes two infrared cameras and three markers for reflecting infrared rays and is used as an input device.

Various sensors such as gyro, magnets, and cameras that obtain coordinates and a moving direction of an input device that moves in three-dimensional space may be used as the input device. Furthermore, electronics such as mobile phones and personal digital assistants (PDAs) including such a sensor may be used as the input device. Hereinafter, an embodiment of the present invention, as illustrated in FIG. 2, which is a photo showing a wand that includes two infrared cameras and three markers for reflecting infrared rays and is used as an input device, will be described in detail.

Hereinafter, an operation of obtaining coordinates and a moving direction of the input device of FIG. 2 will be described. First, triangulation is used to calculate coordinates of the input device. Coordinates of point P in three-dimensional space are $\bar{X}_R=[X_R, Y_R, Z_R]^T$ and $\bar{X}_L=[X_L, Y_L, Z_L]^T$ in three-dimensional space in images picked up by the two infrared cameras, respectively, and the relationship between the two infrared cameras may be expressed by Equation 1:

$$\bar{X}_L = R\bar{X}_R + T \quad (1),$$

where $\bar{X}_L$ is coordinates of point P that is formed in an image picked up by the left infrared camera, $\bar{X}_R$ is coordinate of point P that is formed in an image picked up by the right infrared camera, R is a scaling coefficient, and T is a translation coefficient.

Next, if $\bar{x}_R \cong \bar{X}_R/Z_R = [x_R, y_R, 1]^T$ and $\bar{x}_L \cong \bar{X}_L/Z_L = [x_L, y_L, 1]^T$, triangulation is a procedure for calculating $(\bar{X}_L, \bar{X}_R)$ that is three-dimensional coordinates by using $(\bar{x}_L, \bar{x}_R)$ and thus, the above Equation 1 may be expressed by Equation 2:

$$Z_L \bar{x}_L = Z_R R \bar{x}_R + T \qquad (2),$$

where $Z_L$ is a z-coordinate component of $\bar{X}_L$, $Z_R$ is a z-coordinate component of $\bar{X}_R$, R is a scaling coefficient, and T is a translation coefficient. Last, $Z_R$ may be expressed by Equation 3:

$$Z_R = \frac{\|\bar{x}_L\|^2 <\bar{\alpha}_R, T> - <\bar{\alpha}_R, \bar{x}_L><\bar{x}_L, T>}{\|\bar{\alpha}_R\|^2 \|\bar{x}_L\|^2 - <\bar{\alpha}_R, \bar{x}_L>^2}, \qquad (3)$$

where $Z_R$ is a z-coordinate component of $\overline{XR}$, R is a scaling coefficient, T is a translation coefficient, and $\bar{\alpha}_R \cong -R\bar{x}_R$.

Next, a plane normal vector $\vec{N}$ that includes coordinates $(X_1, X_2, X_3)$ of three markers of the wand may be calculated so as to calculate the moving direction of the input device.

Even when other device than the input device of FIG. 2 is used as the input device, the coordinates and the moving direction of the input device in data input space may be calculated based on a reference that is used in each input device.

If the coordinates and the moving direction of the input device are input when the input device moves in the data input space, the input curved surface generating unit 110 generates an input curved surface based on the coordinates and the moving direction of the input device. In order to extend the coordinates of the input device from points to lines and surfaces, straight lines and curves that constitute the lines and the surfaces need to be defined. To this end, the Frenet-Serret formulas may be used.

The Frenet-Serret formulas describe the kinematic properties of a particle which moves along a continuous, differentiable curve in three-dimensional Euclidean space. More specifically, the formulas describe the derivatives of the so-called tangent, normal, and binormal unit vectors in terms of each other. If a change in coordinates of the input device that moves along a spatial curve in the data input space according to time is r(t), curvature and torsion of the spatial curve may be expressed by Equation 4:

$$\kappa = \frac{\|r'(t) \times r''(t)\|}{\|r'(t)\|^3} \qquad (4)$$

$$\tau = \frac{(r'(t) \times r''(t)) \cdot r'''(t)}{\|r'(t) \times r''(t)\|^2},$$

where r(t) is a parameter equation of the spatial curve in the data input space, κ is curvature, and τ is torsion.

Next, a distance at which the input device moves on the spatial curve during time t is parametrized by arc length and may be expressed by Equation 5:

$$s(t) = \int_0^t \|r'(t)\| dt, \qquad (5)$$

where s(t) is a distance at which the input device moves in the spatial curve, and r(t) is a parameter equation of the spatial curve.

Thus, the Frenet-Serret formulas may be stated more concisely using matrix notation, as expressed by Equation 6:

$$\begin{bmatrix} T' \\ N' \\ B' \end{bmatrix} = \begin{bmatrix} 0 & \kappa & 0 \\ -\kappa & 0 & \tau \\ 0 & -\tau & 0 \end{bmatrix} \begin{bmatrix} T \\ N \\ B \end{bmatrix}, \qquad (6)$$

where κ is curvature, τ is torsion, T is a tangent unit vector, N is a normal unit vector, and B is a binormal unit vector and thus, B=T×N.

Figure 3:
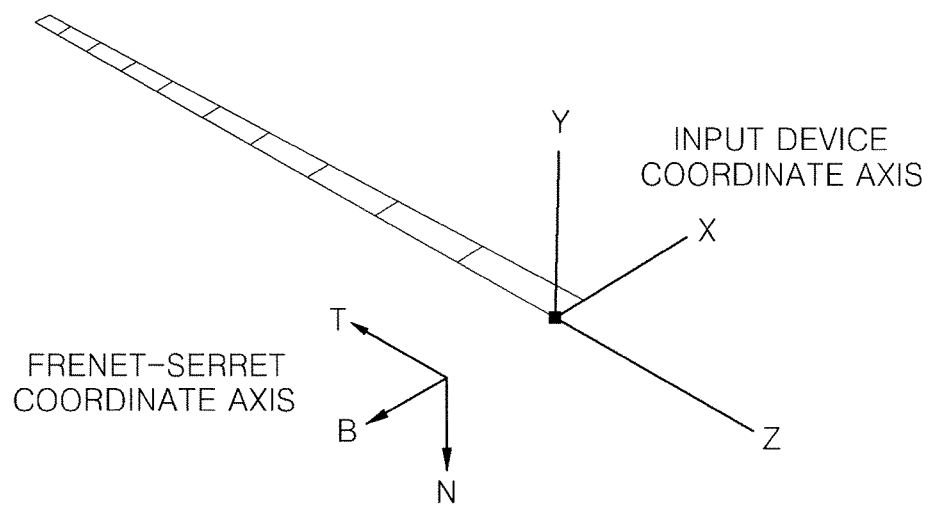
FIG. 3 illustrates a Frenet-Serret coordinate axis that is determined according to movement of an input device.

FIG. 3 illustrates a Frenet-Serret coordinate axis that is determined according to movement of an input device. Referring to FIG. 3, a coordinate system of the input device has coordinate axes $\vec{X}$, $\vec{Y}$, and $\vec{Z}$ while the input coordinates of the input device are set to its starting point. When the input device moves along the coordinate axis $\vec{Z}$, the Frenet-Serret coordinate system is determined by a tangent vector and a normal vector with respect to the coordinate axis $\vec{Z}$ that indicates the moving direction of the input device.

An input curve that is a base for generating the input curved surface based on the coordinates and the moving direction of the input device is needed. The input curve corresponds to a spatial curve that is a trajectory at which the input device moves in the data input space, and the input curved surface generating unit 110 may set the relationship between the coordinate system of the input device and the Frenet-Serret coordinate axis so as to determine the shape of the input curve. The relationship between the coordinate system of the input device and the Frenet-Serret coordinate axis may be expressed by Equation 7:

$$P_{0,\ldots,t} = Hr(t)_{0,\ldots,t} \qquad (7),$$

where $P_{0,\ldots,t}$ is three-dimensional coordinates that constitute the input curve changed from the spatial curve, H is a matrix that converts the Frenet-Serret coordinate system into the coordinate system of the input device, and $r(t_{0,\ldots,t})$ is coordinates between [0,t] that constitute the spatial curve.

Figure 4A:
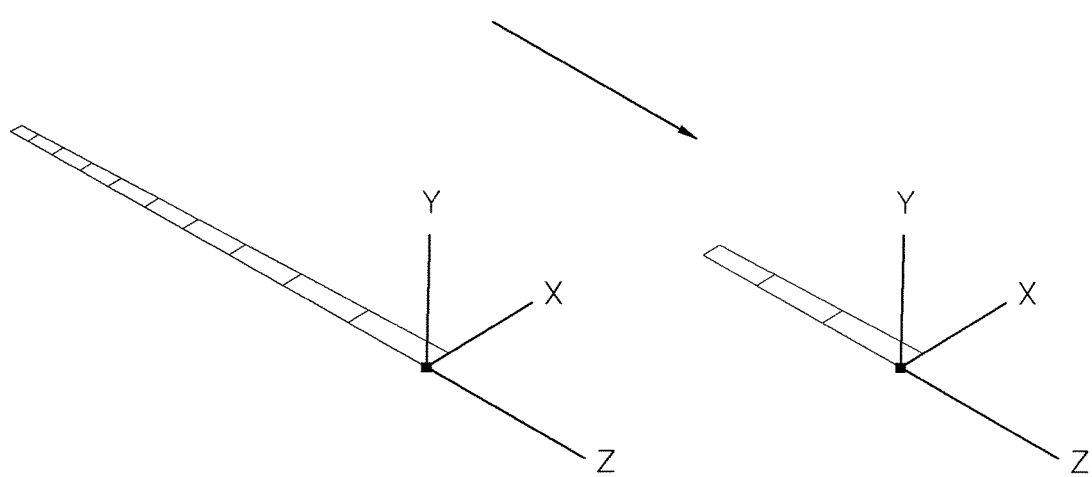
FIGS. 4A through 4C illustrate an operation of controlling a length, curvature, and torsion of an input curve.
Figure 4B:
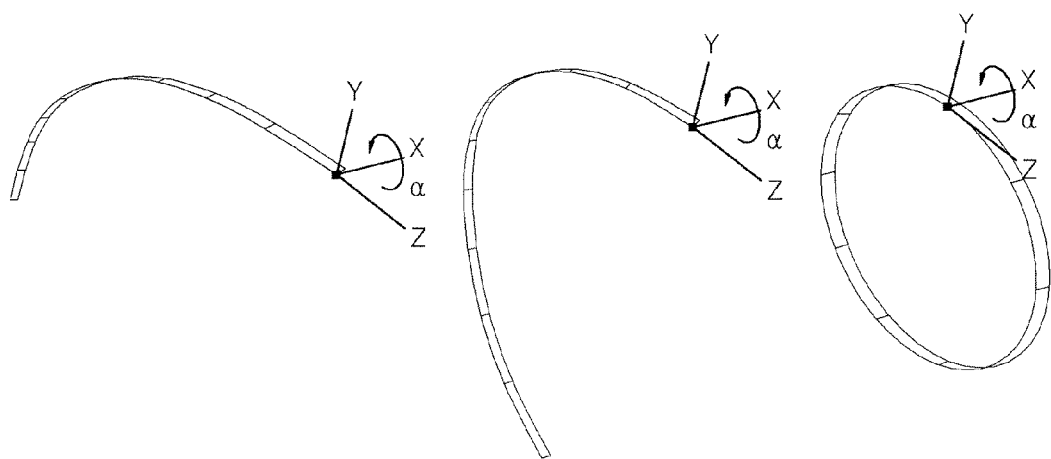
Figure 4C:
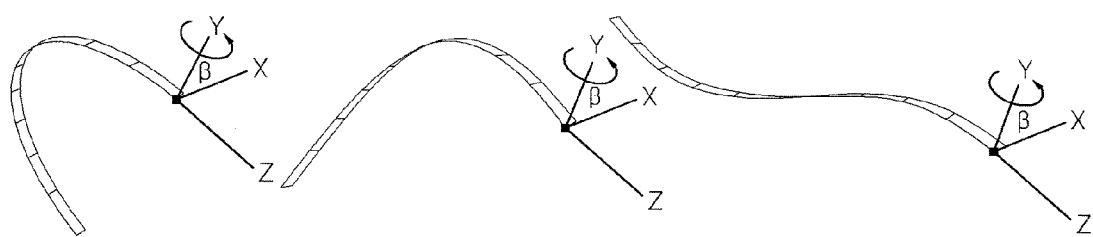

FIGS. 4A through 4C illustrate an operation of controlling a length, curvature, and torsion of an input curve. Referring to FIG. 4A, the length of the input curve may be adjusted when the input device moves in a direction of the coordinate axis $\vec{Z}$. Referring to FIG. 4B, curvature κ of the input curve may be adjusted when the input device is rotated around the coordinate axis $\vec{X}$. Referring to FIG. 4C, torsion τ of the input curve may be adjusted when the input device is rotated around the coordinate axis $\vec{Y}$.

Figure 5A:
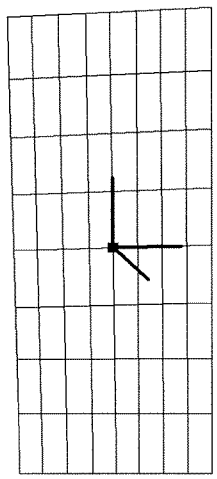
FIGS. 5A and 5B illustrate input curved surfaces generated from an input curve.
Figure 5A:
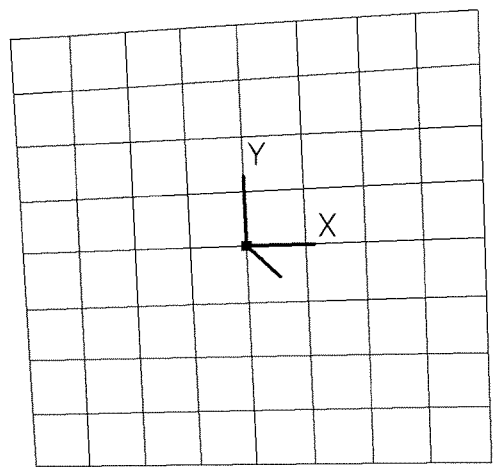
Figure 5A:
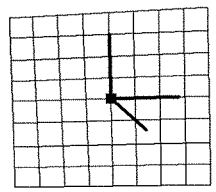
Figure 5A:
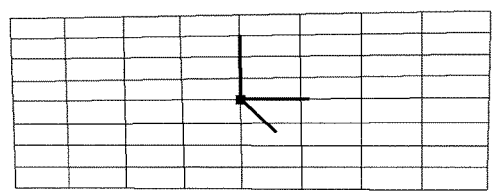
Figure 5B:
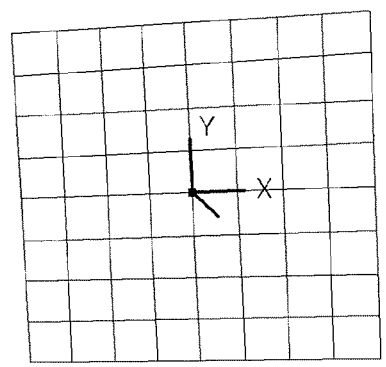
Figure 5B:
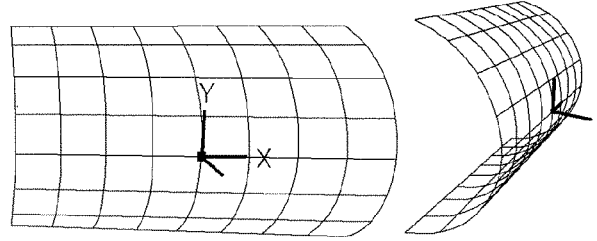
Figure 5B:
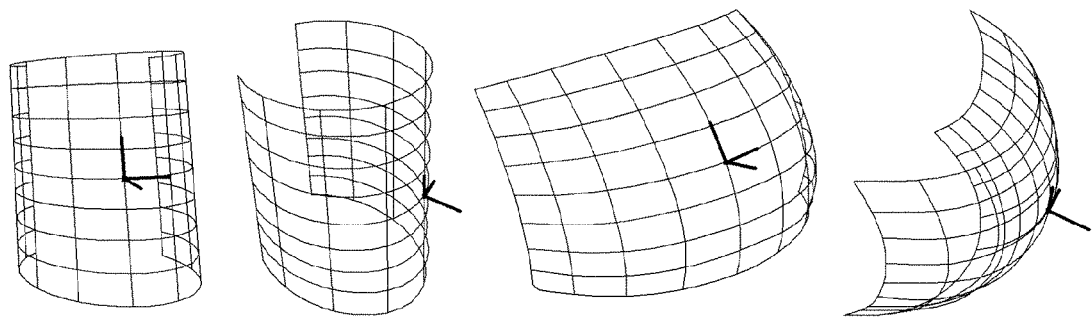

Next, the input curved surface generating unit 110 generates an input curved surface based on the generated input curve. The generated input curved surface is formed of a plurality of input points. When the input curved surface is generated and the relationship between the coordinate system of the input device and the Frenet-Serret coordinate axis is set, the shape of the input curved surface may be set. FIGS. 5A and 5B illustrate input curved surfaces generated from the input curve. Referring to FIG. 5A, the width or length of the input curved surface may be adjusted when the input device moves along each coordinate axis of the input device. Referring to FIG. 5B, the shape of the input curved surface may be adjusted when the input device is rotated based on each coordinate axis of the coordinate system of the input device.

The input curved surface is a base for a curved surface model that is to be generated by three-dimensional modeling, and a three-dimensional curved surface model may be generated by combining a plurality of input curved surfaces. In this manner, a three-dimensional input curved surface is generated by an input that is a base for three-dimensional modeling. Thus, three-dimensional modeling may be intuitively performed without a user's complicated input operation as compared to a case where two-dimensional input is used.

The input point arrangement unit 120 generates three-dimensional coordinate space that corresponds to the data input space and is formed of a plurality of unit grids, and arranges the input points in each of the unit grids.

The three-dimensional coordinate space is space in which three-dimensional modeling is substantially performed based on the input curved surface that is generated according to movement of the input device in the data input space. The size of the three-dimensional coordinate space is the same as that of the data input space or is scaled at a predetermined ratio. The input curved surface that is formed of the plurality of input points is arranged in the three-dimensional coordinate space like in the data input space, and each of the input points is included in each of the unit grids. Three-dimensional modeling is performed when the unit grids including the input points are connected to each other.

Figure 6:
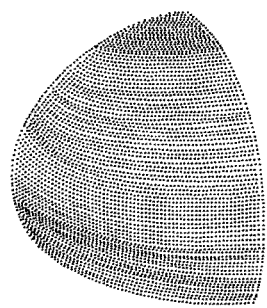
FIG. 6 are four images illustrating accuracy of a ⅛ sphere according to the sizes of unit grids.
Figure 6:
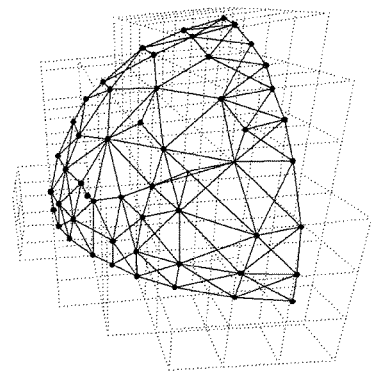
Figure 6:
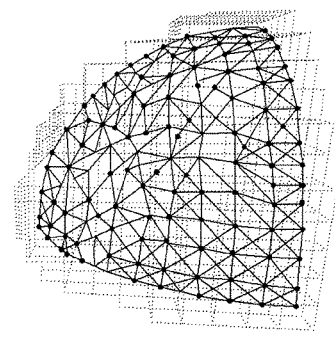
Figure 6:
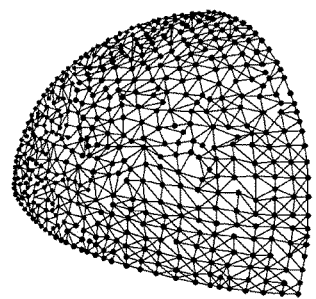

When the three-dimensional coordinate space used for three-dimensional modeling is divided into unit grids, the amount of calculation required in final modeling is decreased as compared to a case where unit grids are not used. Also, the less size of the unit grid, the greater the amount of calculation, and accuracy is improved. Thus, the sizes of the unit grids may be adjusted according to accuracy required in three-dimensional modeling. FIG. 6 are four images illustrating accuracy of a ⅛ sphere according to the sizes of unit grids. Referring to (a) of FIG. 6, the ⅛ sphere includes 8281 input points. Referring to (b) of FIG. 6, when the size of the unit grid is 4, the ⅛ sphere is modeled by 72 unit grids. Thus, many edged portions are formed in a round surface of the ⅛ sphere. (c) of FIG. 6 illustrates a ⅛ sphere that is modeled by 253 unit grids when the size of the unit grid is 2, and (d) of FIG. 6 illustrates a ⅛ sphere that is modeled by 869 unit grids when the size of the unit grid is 1. Referring to (c) and (d) of FIG. 6, the less size of the unit grid, the more accurate the round surface of the ⅛ sphere.

The representative point determining unit 130 determines a representative point of each of the unit grids based on the coordinates of the input points included in each unit grid and generating a group of representative points with respect to each of the input curved surfaces.

The input points that constitute the input curved surface are approximate to each other in the coordinate space and thus the plurality of input points is located in the same unit grid. When three-dimensional modeling is performed by connecting the unit grids that include the input points, one coordinates that represent the coordinates of the plurality of input points included in one unit grid are determined so that the amount of calculation required in three-dimensional modeling may be reduced. A coordinate value of the representative point may be determined by selecting one among from coordinate values of the plurality of input points included in one unit grid or by calculating the average of the coordinate values of the plurality of input points. Meanwhile, when the unit grid includes one input point, an input point is determined as a representative point. When the representative point is determined by the representative point determining unit 130 in all of the unit grids that include the plurality of input points, each representative point is coordinates that represent the unit grids.

On the other hand, input points that constitute different input curved surfaces may be located in the same unit grid. In detail, for example, after one input curved surface is generated when the input device moves in the data input space, when another input curved surface is continuously and additionally generated, two input curved surfaces are included in the same unit grid. When a representative point is determined based on input points that constitute each input curved surface in a predetermined unit grid, a plurality of representative points that are determined from each input curved surface may be present in the same unit grid. In order to prevent the plurality of representative points that are determined from each input curved surface from being present in the same unit grid, the representative point determining unit 130 may determine a point in a line in which the representative points determined from the input points that constitute each input curved surface are connected to each other, or a point in an area that involves a boundary line and an inside of a diagram formed by the line in which the representative points determined from the input points that constitute each input curved surface are connected to each other, as a representative point of the unit grid. In other words, the representative point of the unit grid is determined by the weighted average of the coordinate values of the plurality of representative points that are determined from each input curved surface included in the same unit grid.

Figure 7:
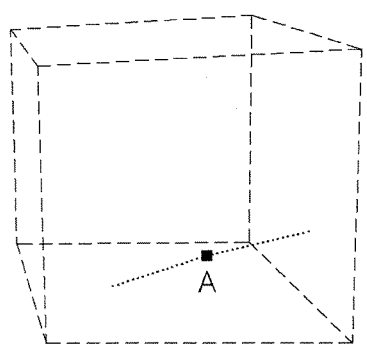
FIG. 7 is a view of representative points of unit grids that are determined when input points that constitute an input curved surface are located in the same unit grid.
Figure 7:
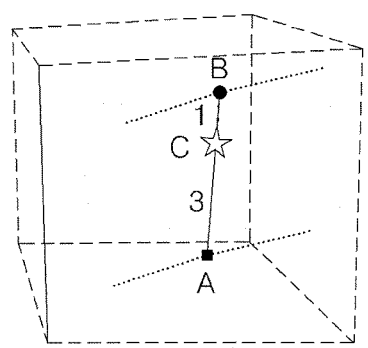

FIG. 7 is a view of representative points of unit grids that are determined when input points that constitute different input curved surfaces are located in the same unit grid. Referring to FIG. 7, when only one input curved surface is included in one unit grid, A is determined as the representative point of the unit grid by the average of coordinate values of the input points that constitute an input curved surface. However, when two input curved surfaces are included in one unit grid, as shown in the right side of FIG. 7, C that is a point in a line in which A and B that are representative points determined from the input points that constitute each input curved surface are connected to each other, is determined as a representative point of the unit grid. When the representative point of the unit grid is determined, a weight is given to each of coordinate values of the representative points A and B, thereby determining a representative point C by the weighted average of the coordinate values of the representative points A and B. In this case, the weight given to each of the coordinate values of the representative points A and B may be determined according to time at which each input curved surface is generated. In other words, as illustrated in FIG. 7, a higher weight 3 is given to the representative point A determined from the previously-generated input curved surface, and a lower weight 1 is given to the representative point B determined from the later-generated input curved surface so that the representative point C of the unit grid may be determined by the weighted average of the coordinate values of the representative points A and B.

The polygon generating unit 140 selects one representative point sequentially from among representative points as a central representative point and connects auxiliary representative points that are adjacent to the selected central representative point to the selected central representative point, thereby generating polygon.

When the unit grids including the input points are connected to each other during three-dimensional modeling, a three-dimensional shape corresponding to the input curved surface is generated. In this case, in order to make the surface of the three-dimensional shape smooth, the representative points that represent each unit grid are connected to each other so that three-dimensional modeling may be performed.

Figure 8:
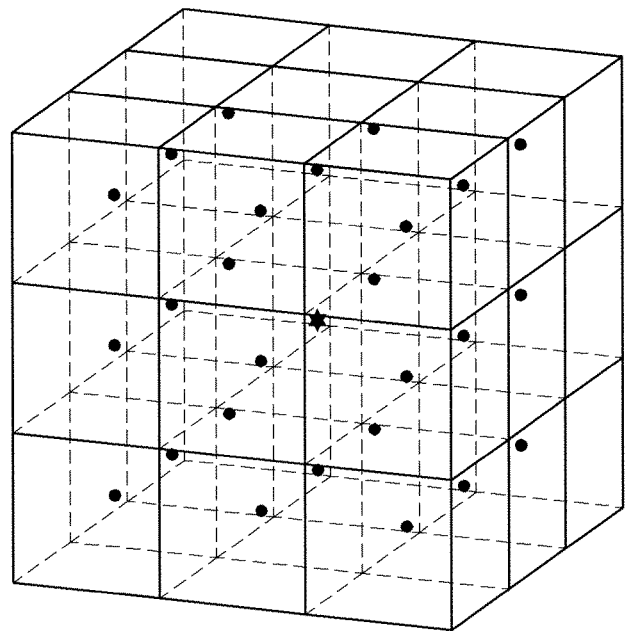
FIG. 8 is a view of a central representative point which is sequentially selected from among representative points, and auxiliary representative points that are adjacent to the central representative point.

FIG. 8 is a view of a central representative point which is sequentially selected from among representative points, and auxiliary representative points that are adjacent to the central representative point. In FIG. 8, the central representative point is indicated by star ☐, and the auxiliary representative points are indicated by black dots. Referring to FIG. 8, the central representative point is adjacent to 26 (maximum) auxiliary representative points. The number of the auxiliary representative points is determined by the number of unit grids that include input points and are adjacent to the unit grid corresponding to the central representative point. The polygon generating unit 140 generates polygon having a polygonal shape by connecting the selected central representative point and the auxiliary representative points. The central representative point is sequentially selected from among the representative points and thus, when all of the representative points that are determined in the coordinate space are selected as the central representative point, polygons may be generated with respect to the representative points.

As illustrated in FIG. 8, 26 (maximum) auxiliary representative points are present with respect to one central representative point. Thus, the number of cases of polygon that may be generated based on the central representative point and the auxiliary representative points is increased, and the amount of calculation in three-dimensional modeling is also increased. Thus, the auxiliary representative points are classified into a few groups, and polygonal patterns that are generated by connecting the central representative point and the auxiliary representative points are combined with respect to each of the groups so that polygon may be generated.

To this end, sample patterns that are polygonal patterns generated by connecting representative points determined from a unit grid located in each vertex of a hexahedral grid block in which adjacent unit grids are set to each vertex in the coordinate space, are stored in the storage unit 150 according to positions and number of the representative points. Also, the polygon generating unit 140 generates polygon with respect to the central representative point by combining the sample patterns of which positions and number are identical with the positions and number of the central representative point and the auxiliary representative points, from among the sample patterns stored in the storage unit 150 with respect to the grid block in which a unit grid corresponding to the central representative point is set to one vertex.

Figure 9:
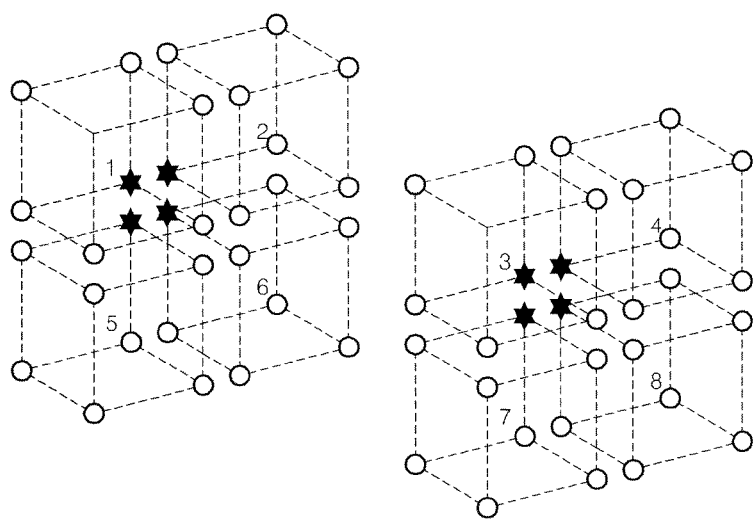
FIG. 9 is a view of grid blocks formed when a unit grid corresponding to a central representative point and adjacent unit grids are set to vertexes in coordinate space.
Figure 10A:
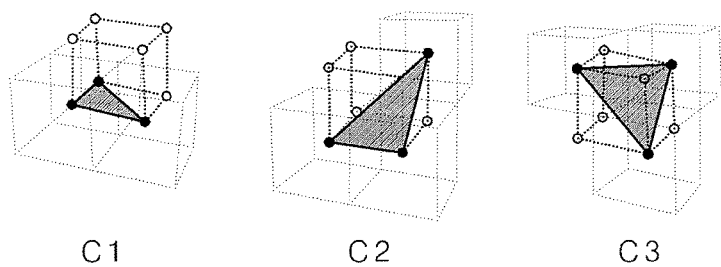
FIGS. 10A through 10E illustrate shapes of sample patterns that may be formed when the number of representative points is 3 through 7 on a grid block.
Figure 10B:
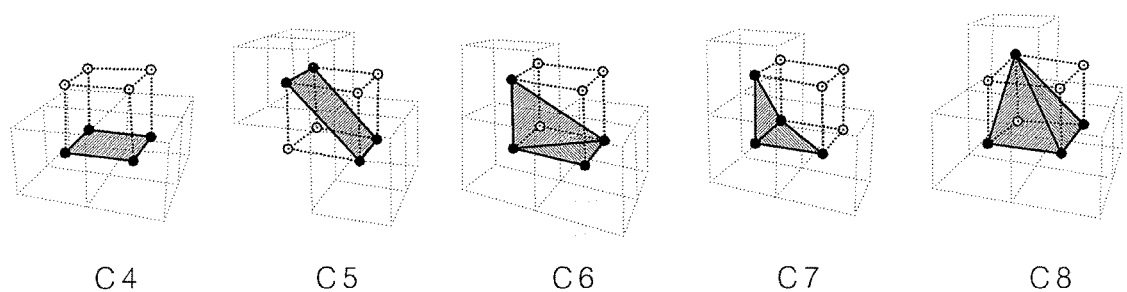
Figure 10C:
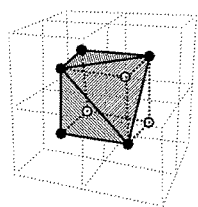
Figure 10D:
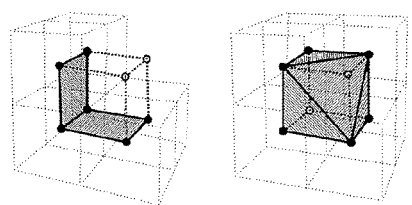
Figure 10E:
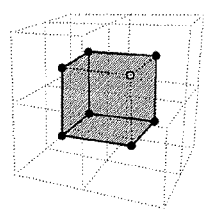

FIG. 9 is a view of grid blocks formed when a unit grid corresponding to a central representative point in coordinate space and adjacent unit grids are set to vertexes. For convenience of explanation, all of unit grids located in vertexes of the grid block are not shown, and a central point of each unit grid is set to a vertex of a grid block. Referring to FIG. 9, the unit grid corresponding to the central representative point □ and 7 adjacent unit grids constitute one grid block. Thus, 8 grid blocks in which the unit grid corresponding to the same central representative point is set to a vertex may be formed. The polygon generating unit 140 generates polygon with respect the central representative point by selecting sample patterns that may be applied to each of 8 grid blocks that share the unit grid corresponding to the central representative point, from among the sample patterns stored in the storage unit 150 and by combining the selected sample patterns. In this case, a reference that is used to select the sample patterns that may be applied to each grid block from among the sample patterns stored in the storage unit 150 is a unit grid that includes input points and is selected from among unit grids located in each vertex of a grid block, i.e., positions and number of the central representative point and the auxiliary representative points on the grid block.

The numbers of the central representative point and the auxiliary representative points that are connected to each other on one grid block and constitute a polygonal pattern is 3 (minimum) to 7 (maximum). If the number of the representative points is 2, a straight line is formed when the representative points are connected to each other, and if the number of the representative points is 8, a hexahedron is formed when the representative points are connected to each other and thus, proper polygonal patterns may not be generated. The sample patterns that are generated by connecting the central representative point and the auxiliary representative are stored in the storage unit 150 according to the number of unit grids that include input points and are selected from among unit grids located in each vertex of the grid block.

Figure 11:
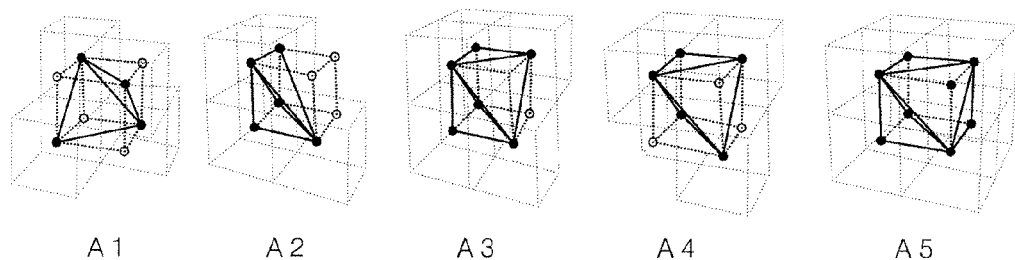
FIG. 11 is a view of examples that may not be sample patterns.

FIGS. 10A through 10E illustrate shapes of sample patterns that may be formed when the number of representative points is 3 through 7 on a grid block. In FIGS. 10A through 10E, black dots denote representative points that are determined with respect to a unit grid that includes input points and is selected from among unit grids located in a vertex of a grid block, and white dots denote unit grids that do not include input points and are selected from among unit grids located in the vertex of the grid block. Referring to FIGS. 10A through 10E, 5 (maximum) sample patterns may be generated according to the number of representative points located on the grid block. Polygonal patterns that are obtained when one sample pattern from among the sample patterns illustrated in FIGS. 10A through 10E is moved symmetrical with one of the representative points or is rotated correspond to the same sample patterns. FIG. 11 is a view of examples in which representative points may not be used as sample patterns. When representative points are arranged, as illustrated in FIG. 11, a polygonal shape is not generated even when the representative points are connected to one another, and thus, the representative patterns may not be used as sample patterns.

The polygon generating unit 140 checks the number and positions of representative points on each grid block in which a unit grid corresponding to the same central representative point is set to one vertex and combines sample patterns of which positions and number are identical with positions and number of the representative points from among the sample patterns stored in the storage unit 150, thereby generating polygon with respect to the central representative point. Polygon that is generated by one sample pattern or polygon that is generated by combining 8 sample patterns may be formed according to the number of sample patterns that may be applied to each of 8 grid blocks in which the unit grid corresponding to the same central representative point is set to a vertex. In this way, when polygon with respect to the central representative point is generated by combining 1 to 8 sample patterns, the amount of calculation required in three-dimensional modeling may be remarkably reduced as compared to a case where polygon is generated using the central representative point and 26 (maximum) auxiliary representative points.

Figure 12:
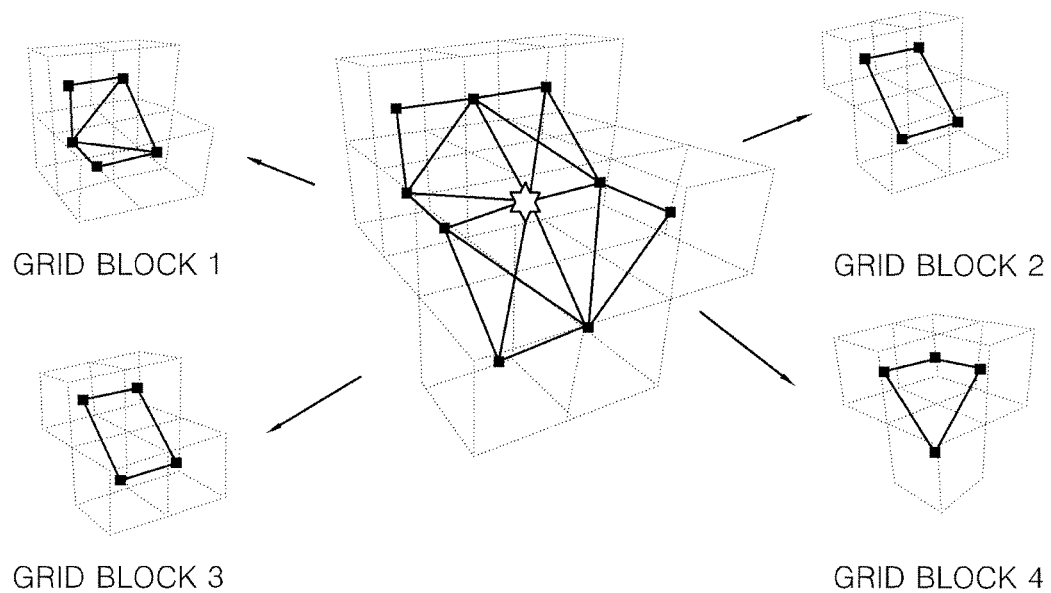
FIG. 12 is a view of an example for generating polygon with respect to a central representative point.
Figure 13:
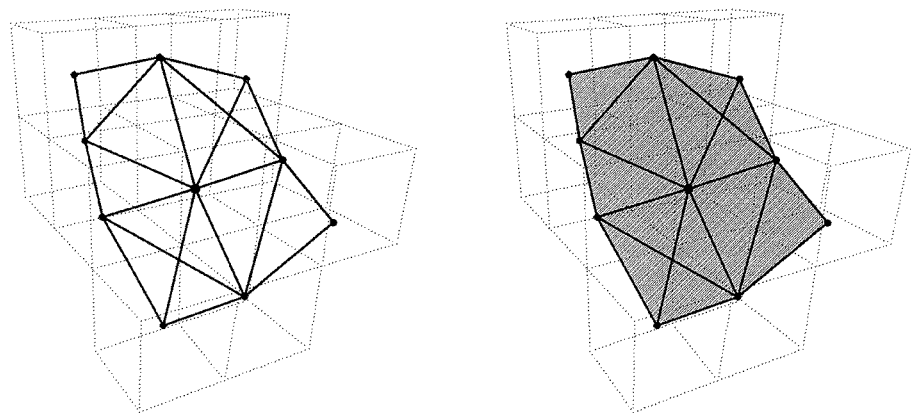
FIG. 13 is a view of polygon that is formed by combining the sample patterns that are selected from among grid blocks 1 through 4.

FIG. 12 is a view of an example for generating polygon with respect to a central representative point. Referring to FIG. 12, auxiliary representative points are located only on four grid blocks selected from among 8 grid blocks that may be generated when a unit grid corresponding to the central representative point □ is set to a vertex. When the four grid blocks are grid blocks 1 to 4, respectively, four representative points including the central representative point are located in the grid blocks 1 to 4. The polygon generating unit 140 generates polygon with respect to the central representative point by combining the sample patterns that are identical with the relationship between positions of the representative points located in the grid blocks 1 to 4 selected from among the sample patterns illustrated in FIG. 10B. In this case, the positions of the representative points are the same on the grid blocks 2 and 3, and thus, the same sample patterns are applied to the grid blocks 2 and 3. FIG. 13 is a view of polygon that is formed by combining the sample patterns that are selected from among the grid blocks 1 to 4. Polygon illustrated in FIG. 13 corresponds to polygon generated with respect to the central representative point of FIG. 12.

Meanwhile, when the sample patterns that are identical with positions and the number of the representative points on the grid blocks may not be found in the sample patterns stored in the storage unit 150, the number or positions of the representative points are adjusted to be identical with one from among the sample patterns stored in the storage unit 150. In case of a grid block having a total number of 2 of representative points including the central representative point, the sample patterns that are identical with the positions and the number of the representative points on the grid blocks 1 to 4 may not be found. However, in case of a grid block having 8 representative points, the position of the central representative point is fixed, and one is eliminated from the auxiliary representative points so that the sample patterns may be identical with the sample patterns of FIG. 10E. Even in case of other grid blocks, at least one is eliminated from the auxiliary representative points or is moved so that the sample patterns may be identical with the sample patterns stored in the storage unit 150.

Figure 14A:
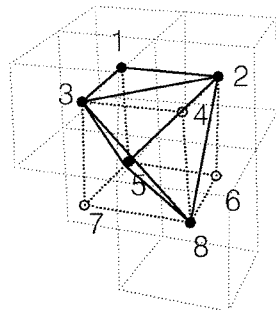
FIGS. 14A through 14C are views of an example in which the number of representative points is adjusted to be identical with the number of sample patterns on a grid block.
Figure 14B:
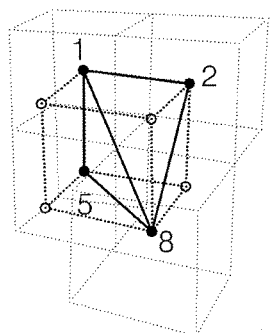
Figure 14C:
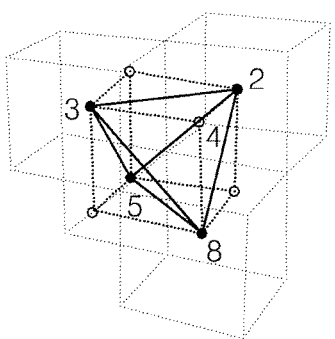

FIGS. 14A through 14C are views of an example in which the number of representative points is adjusted to be identical with the number of sample patterns on a grid block. Referring to FIG. 14A, 5 representative points are located in positions 1, 2, 3, 5, and 8 on the grid block, as in A4 of the polygonal patterns illustrated in FIG. 11 and thus, the sample patterns that are identical with the positions and the number of the representative points on the grid blocks 1 to 4 may not be found. In this case, if the representative point located in the position 3 is eliminated, as illustrated in FIG. 14B, 4 representative points located in the positions 1, 2, 5, and 8 remain, and 4 representative points are located in the position of C8 of the sample patterns of FIG. 10B. However, the positions of the representative points that are obtained by removing the representative point located in the position 1 are identical with the position of A1 of FIG. 11, as illustrated in FIG. 14C. Thus, the samples patterns of which positions and number are identical with the positions and the number of the representative points on the grid blocks 1 to 4 may not be found.

Figure 15:
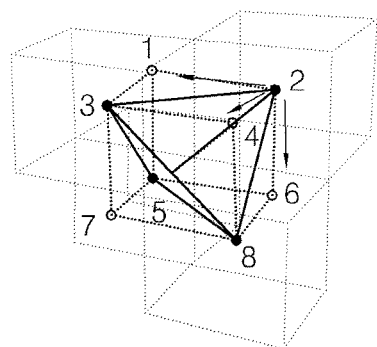
FIG. 15 is a view of an example in which positions of representative points are adjusted to be identical with positions of sample patterns on a grid block.

FIG. 15 is a view of an example in which positions of representative points are adjusted to be identical with positions of sample patterns on a grid block. Referring to FIG. 15, when 4 representative points are located in the position of A1 of the polygonal patterns of FIG. 11, sample patterns of which positions are identical with those of the representative points may not be present in the sample patterns of FIG. 10B. When the representative point located in the position 2 is moved to the position 1, 4 or 6, the position of the representative point is identical with that of C8 of the sample patterns of FIG. 10B.

Even when sample patterns that are identical with positions and number of the central representative point and auxiliary representative points are not present in the sample patterns stored in the storage unit 150, the identical sample patterns may not be found, the polygon generating unit 140 eliminates at least one from the auxiliary representative points on the grid block or moves the positions of the auxiliary representative points so that the positions of the auxiliary representative points may be identical with one from among the sample patterns stored in the storage unit 150. Thus, when polygon is generated with respect to a central representative point by combining the sample patterns, the most auxiliary representative points if possible may be used.

As another problem that may occur when polygon is generated, a plurality of unit grids including input points may be adjacent to one another along the two or more coordinate axes of the coordinate space. In this case, the thickness of generated polygon is too large, or polygon of which direction is not known is generated so that the shape of a curved surface model that is to be generated by the curved surface model generating unit 160 that will be described later may be different from an original shape of the input curved surface. Thus, the thickness of polygon needs to be adjusted so as to prevent the problem.

Figure 16:
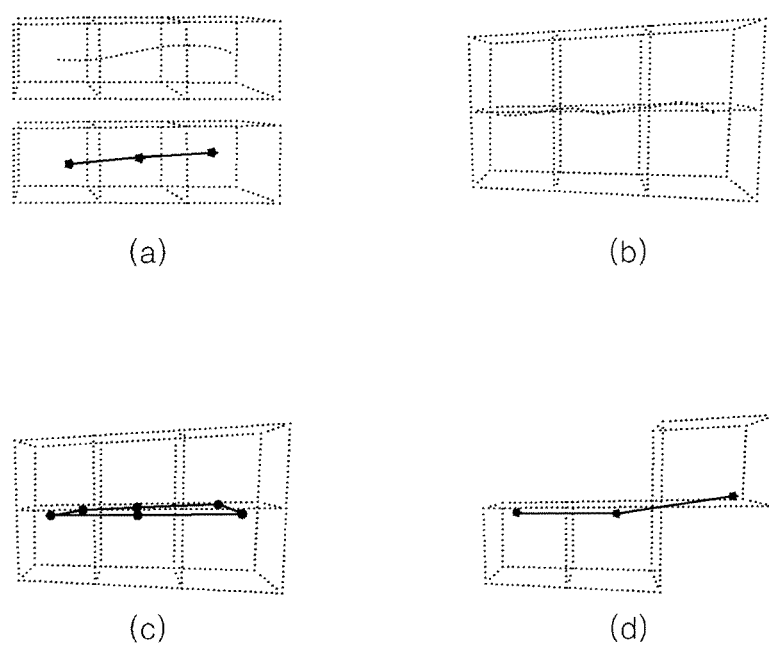
FIG. 16 is a view of an example in which directivity of polygon is vague.

FIG. 16 is a view of an example in which directivity of polygon is vague. Referring to (a) of FIG. 16, when the input points that constitute an input curved surface are distributed near the center of the unit grid and a representative point that is determined with respect to each unit grid is located in the center of the unit grid, polygon generated with respect to the central representative point has directivity. However, when the input points that constitute the input curved surface are distributed in a boundary portion of adjacent unit grids, a representative point with respect to all of the adjacent unit grids is determined, as illustrated in (c) of FIG. 16. In particular, if shake occurs when the input device moves, the input points are included in the unit grid that does not relate to the moving direction of the input device so that the above result may occur. As a result, the thickness of polygon generated with respect to the central representative point is increased so that the shape of the curved surface model that is to be generated by the curved surface model generating unit 160 may be different from an original shape of the input curved surface. When representative points indicated by A are maintained and only representative points indicated by B are eliminated, as illustrated in (d) of FIG. 16, polygon having a thickness of a unit grid is generated so that the shape of the curved surface model may be approximate to the shape of the input curved surface.

In order to adjust the thickness of polygon that is generated by the polygon generating unit 140, the representative point determining unit 130 eliminates representative points that are determined in a different position from the moving direction of the input device in the coordinate space. Thus, the polygon generating unit 140 does not generate polygon with respect to the eliminated representative point.

Figure 17:
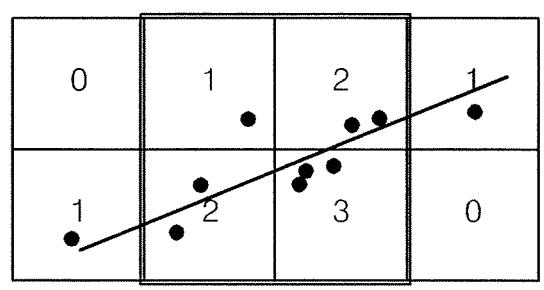
FIG. 17 is a view of an example in which representative points are eliminated by a representative point determining unit.

FIG. 17 is a view of an example in which representative points are eliminated by the representative point determining unit 130. In FIG. 17, unit grids that are disposed adjacent to one another are formed in a two-dimensional form, and a line that crosses the unit grids denotes a cross-section of the input curved surface. In this case, the direction of the input curved surface is identical with the moving direction of the input device in the data input space. Only one input point is included in the unit grid located in an upper portion of the left side of four unit grids surrounded by thick lines, and the input point is located in a different position from the moving direction of the input device, i.e., the direction of the input curved surface. Thus, the representative point determining unit 130 eliminates representative points that are determined with respect to the unit grid including the input point so that polygon may not be generated with respect to the representative points. In this way, curved surface models that will be generated later may have the same directivity as the input curved surface.

The curved surface model generating unit 160 generates a curved surface model with respect to each of the groups of representative points by connecting polygons that are generated with respect to the respective representative points.

Figure 18:
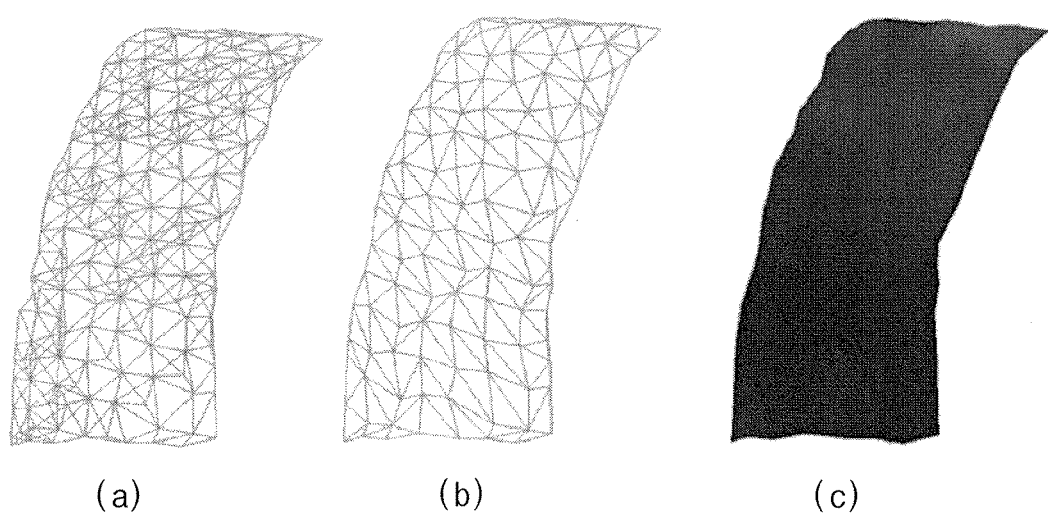
FIG. 18 is a view of a model of a curved surface that is generated by a curved surface model generating unit.

When all of the representative points determined with respect to the unit grids in the coordinate space are sequentially selected as the central representative point and polygons are generated with all of the representative points, the curved surface model generating unit 160 generates the curved surface model with respect to each of the input curved surfaces by connecting the polygons generated with respect to each of the representative points, and the generated curved surface models have the same shape as the respective input curved surfaces generated by the input curved surface generating unit 110. FIG. 18 is a view of curved surface model that is generated by the curved surface model generating unit 160. Referring to (a) and (b) of FIG. 18, polygons are generated with respect to each of the representative points. In (a) of FIG. 18, polygons having no directivity or a large thickness may be included, and thus, thicknesses of the curved surface models are not uniform. As described previously, an operation of removing auxiliary representative points when polygon is generated is included, and thicknesses of polygons are uniform, and by connecting the polygons, curved surface models having a uniform thickness are generated, as illustrated (b) of FIG. 18.

The curved surface model combining unit 180 combines the curved surface models and adjacent curved surface models that are additionally generated to be adjacent to the curved surface models in the coordinate space to generate a final three-dimensional image.

Figure 19:
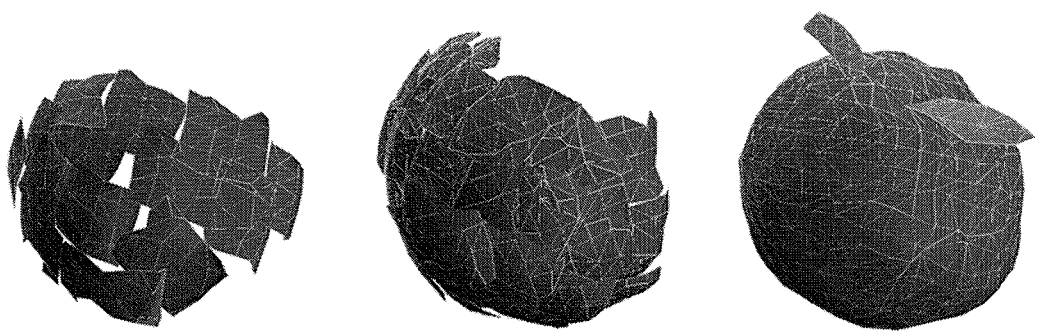
FIG. 19 is a view of an example of a three-dimensional image that is formed by combining a plurality of curved surface models.

Like in a case where stroke is repeatedly applied to finally generate a three-dimensional model when modeling is performed on a two-dimensional plane, even in the case of three-dimensional modeling, a plurality of curved surface models are connected to one another, and a three-dimensional model is generated as a final resultant structure. Thus, the input curved surface generating unit 110 generates a plurality of input curved surfaces sequentially by using the input device, and a plurality of curved surface models are generated by the curved surface model generating unit 160 to correspond to the plurality of input curved surfaces. The curved surface model combining unit 180 combines the plurality of curved surface models to generate a final three-dimensional image. FIG. 19 is a view of an example of a three-dimensional image that is formed by combining a plurality of curved surface models.

When boundaries of the curved surface models are not exactly identical with a boundary of adjacent curved surface models, and are not smoothly connected to each other but cross each other, if the curved surface models and the adjacent curved surface models are combined, the surface of the generated three-dimensional image is not smooth. In actuality, when the input device moves in the data input space and a plurality of input curved surfaces are generated, in order to finally generate the three-dimensional image, two input curved surfaces need to be continuously generated adjacent to each other like in a case where sketch is performed on a two-dimensional plane. Thus, the input curved surfaces overlap or cross each other. Thus, the curved surface models may cross the adjacent curved surface models frequently. Thus, the curved surface model combining unit 180 combines one of a plurality of partial curved surface models that are generated to be divided when the curved surface models cross the adjacent curved surface models so as to make the surface of the finally-generated three-dimensional image smooth, with the adjacent curved surface models.

The contour generating unit 170 that is used to determine whether which partial curved surface model of the plurality of partial curved surface models is to be combined with the adjacent curved surface models generates an outermost contour in which representative points located in the outermost circumferential portions of the curved surface models are connected to each other. Also, the curved surface model combining unit 180 combines a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

Figure 20:
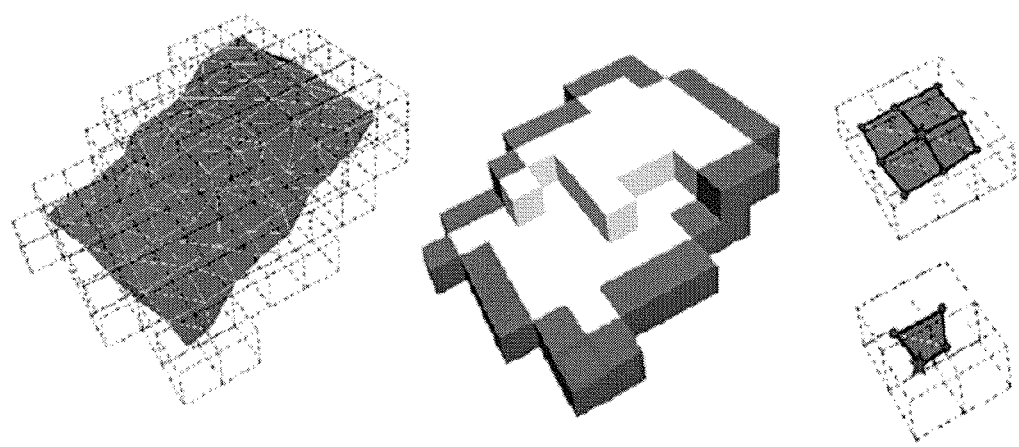
FIG. 20 is a view of an outermost contour that is generated by a contour generating unit.

FIG. 20 is a view of an outermost contour that is generated by the contour generating unit 170. Referring to (a) of FIG. 20, curved surface models are generated by the curved surface model generating unit 160, and unit grids that are a base for generating the curved surface models are indicated by dotted lines. Referring to (b) of FIG. 20, unit grids indicated by dark colors denote unit grids that are located in the outermost circumferential portions of the unit grids indicated by the dotted lines, as illustrated in (a) of FIG. 20. The outermost contour is generated by connecting representative points of the unit grids that are located in the outermost circumferential portions of the curved surface models and are selected from among unit grids including input points. Whether or not the unit grids are located in the outermost circumferential portions of the curved surface models is determined by the number of sample patterns of polygon that is generated with respect to the representative point of the unit grid. In other words, A indicated in (c) of FIG. 20 denotes a case where four sample patterns are combined with one another and polygon is generated with respect to the representative point. The unit grid corresponding to the representative point of A corresponds to a unit grid that is located not in the outermost circumferential portions of the curved surface models but in the curved surface models. Also, referring to (c) of FIG. 20, B denotes polygon including one sample pattern, and unit grids corresponding to the representative point of B correspond to unit grids that are located in the outermost circumferential portions of the curved surface models.

The curved surface model combining unit 180 uses the outermost contour that is generated by the contour generating unit 170 so as to combine the curved surface models and the adjacent curved surface models when they cross each other. In other words, the curved surface model combining unit 180 combines a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

Figure 21:
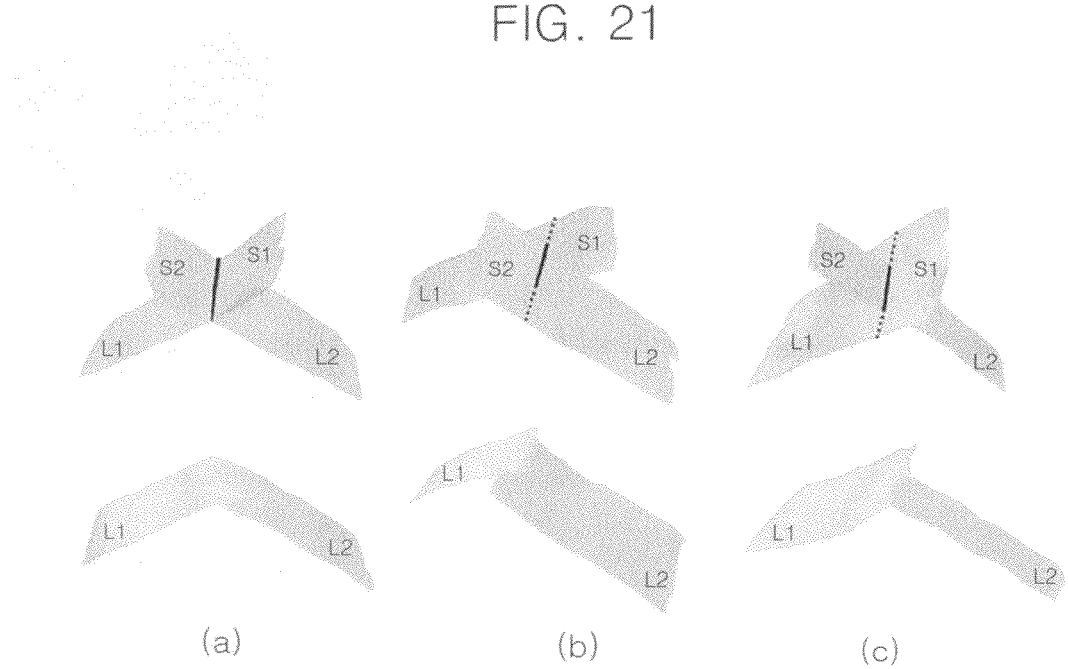
FIG. 21 is a view illustrating an operation of combining two adjacent curved surface models when they cross each other.

FIG. 21 is a view illustrating an operation of combining two adjacent curved surface models when they cross each other. There are three cases where two curved surface models cross each other, such as a case where widths of two curved surface models are the same at a cross point and their boundary lines are identical with each other, as illustrated in (a) of FIG. 21, a case where the two curved surface models cross each other, as illustrated in (b) of FIG. 21, and a case where one curved surface model passes through the other curved surface model and crosses the other curved surface model, as illustrated in (c) of FIG. 21. There are various shapes in which the two adjacent curved surface models cross each other, and the two adjacent curved surface models are combined in the same manner. In other words, when two curved surface models cross each other, a cross point at which they cross each other is illustrated as a plurality of points that constitute one line. Thus, by connecting the points, a straight shape is formed, and the curved surface model is divided by a straight line, and a plurality of partial curved surface models is generated. The two curved surface models illustrated in (a) through (c) of FIG. 21 are divided into L1 and S1, and L2 and S2, respectively. The curved surface model combining unit 180 calculates lengths of the outermost contours of the partial curved surface models and uses the partial curved surface model having the outermost contour of the greatest length to generate a three-dimensional image. The partial curved surface models indicated by L1 and L2 in (a) through (c) of FIG. 21 are partial curved surface models having the outermost contour of the greatest length, and the partial curved surface models indicated by S1 and S2 in (a) through (c) of FIG. 21 are partial curved surface models having the outermost contour of the smallest length. Thus, L1 and L2 having the outermost contours of the greatest length are combined with each other so that the three-dimensional image may be formed.

When the curved surface models and the adjacent curved surface models are combined with one another, when the outermost contours of the two curved surface models cross each other, as illustrated in (a) of FIG. 21, it is easy to calculate the length of the outermost contour with respect to each partial curved surface model. However, when the outermost contours of the two curved surface models do not accurately cross each other, as illustrated in (b) and (c) of FIG. 21, an additional operation is required when the length of each partial curved surface model is calculated.

Figure 22:
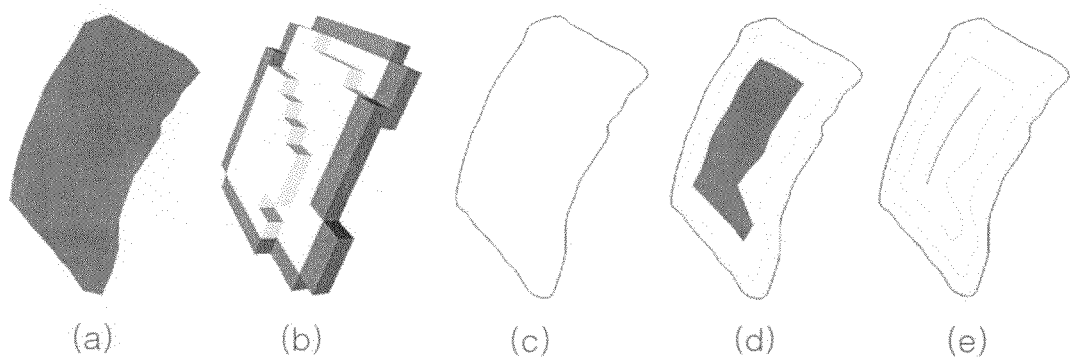
FIG. 22 illustrates internal contours that are sequentially generated in a plurality of curved surface models.

FIG. 22 illustrates internal contours that are sequentially generated in a plurality of curved surface models. (a) of FIG. 22 illustrates a curved surface model that is generated by the curved surface model generating unit 160, and (b) of FIG. 22 illustrates unit grids that are located in the outermost circumferential portions of the curved surface models, and (c) of FIG. 22 illustrates the outermost contour that is generated by connecting representative points located in the outermost circumferential portions of the curved surface models. The contour generating unit 170 generates a plurality of internal contours in the form of a contour line inside the outermost contour so as to prepare for a case where a cross point of the curved surface models and the adjacent curved surface models are present in the curved surface models. In other words, an operation of generating a new internal contour by connecting the representative points that are located in the outermost circumferential portions of the curved surface models from which the outermost contour is eliminated, and an operation of generating a new internal contour by connecting representative points that are located in the outermost circumferential portions of the curved surface models from which the previously-generated internal contour is eliminated, are repeatedly performed so that a plurality of internal contours are generated in the form of a contour line to the center of the curved surface models. The operations are illustrated in (d) and (e) of FIG. 22.

Figure 23:
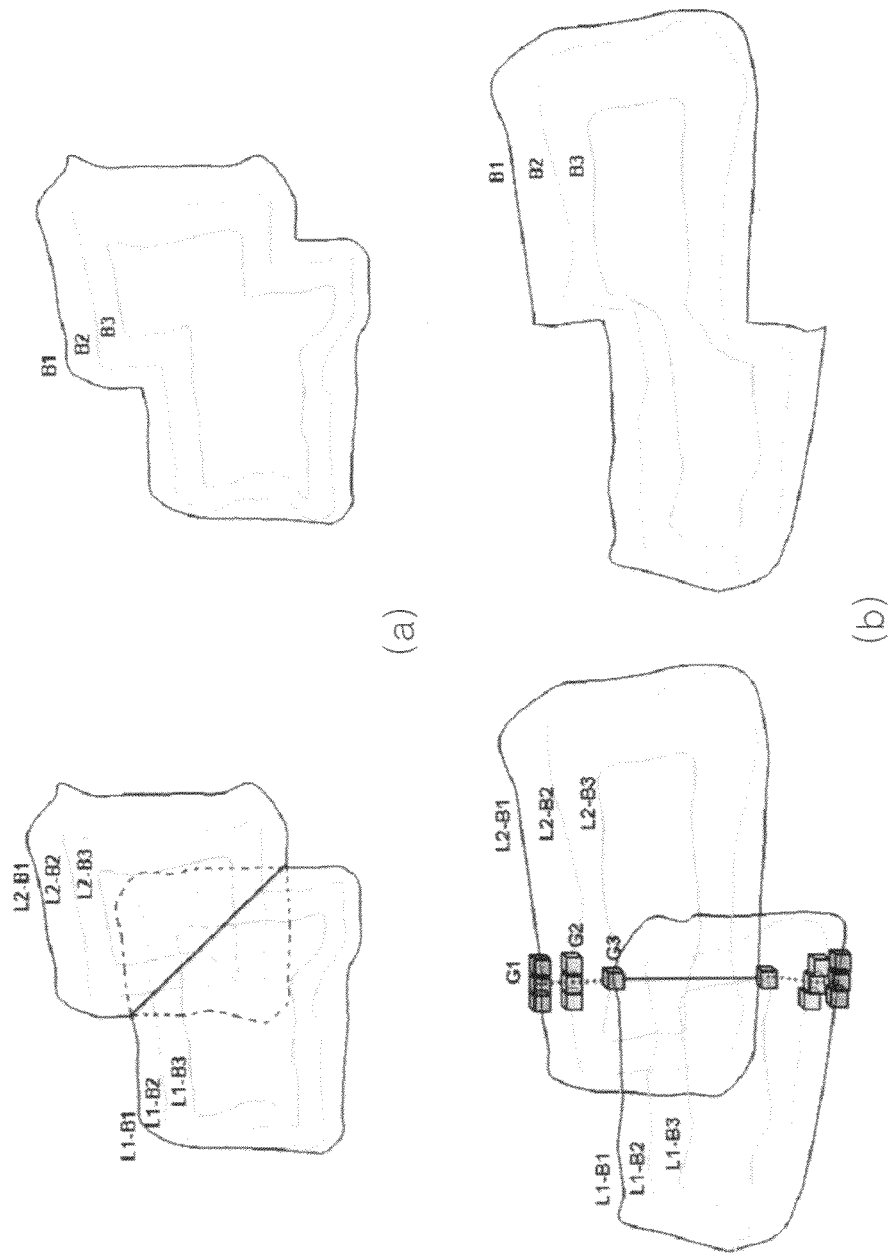
FIG. 23 is a view illustrating an operation of calculating the length of an outermost contour when two curved surface models cross each other, as illustrated in (a) of FIG. 20 and when two curved surface models cross each other, as illustrated in (b) or (c) of FIG. 20, respectively.

When the curved surface models and the adjacent curved surface models cross one other, as illustrated in (b) or (c) of FIG. 21, the curved surface model combining unit 180 uses the internal contours shown in (e) of FIG. 22 in order to calculate the length of the outermost circumferential contour of each partial curved surface model. FIG. 23 is a view illustrating an operation of calculating the length of an outermost contour when two curved surface models cross each other, as illustrated in (a) of FIG. 21 and when two curved surface models cross each other, as illustrated in (b) or (c) of FIG. 21, respectively. Referring to (a) of FIG. 23, an outermost contour is indicated by B1, and internal contours are indicated by B2 and B3. When two curved surface models cross each other accurately, as illustrated in (a) of FIG. 23, internal contours do not need to be used to calculate the length of the outermost contour of each partial curved surface model. In other words, a partial curved surface model having the outermost contour indicated by L1-B1 and a partial curved surface model having the outermost contour indicated by L2-B1 so that a three-dimensional image may be formed.

However, when curved surface models cross each other and their outermost contours do not meet each other, as illustrated in (b) of FIG. 23, the internal contours are used. In other words, a point in which the outermost contour of the curved surface model indicated by L1-B1 crosses an adjacent curved surface model, is G3, which is a representative point that constitutes the internal contours of the adjacent curved surface models. The curved surface model combining unit 180 repeatedly performs an operation of searching internal contours that are located from the internal contour including G3 to internal contours located outside the curved surface models. In (b) of FIG. 23, an internal contour including G2 is located outside the internal contour including G3, and the outermost contour including G1 is located outside the internal contour including G2. Thus, the adjacent curved surface model is divided into two partial curved surface models by a straight line for connecting G1 and a point at which the outermost contour of the adjacent curved surface model meets the curved surface model at an opposite side to G1, and the partial curved surface model having the outermost contour indicated by L2-B1 is combined with the partial curved surface model having the outermost contour indicated by L1-B1 so that a three-dimensional image may be formed.

In this way, when a new representative point is determined with respect to a unit grid, polygon and the curved surface models that are generated based on the unit grid need to be corrected. In other words, the polygon generating unit 140 generates polygon with respect to a third representative point, and the curved surface model generating unit 160 connects polygon generated with respect to the third representative point to polygons generated with respect to the adjacent representative points, thereby correcting the previous-generated curved surface model.

Figure 24:
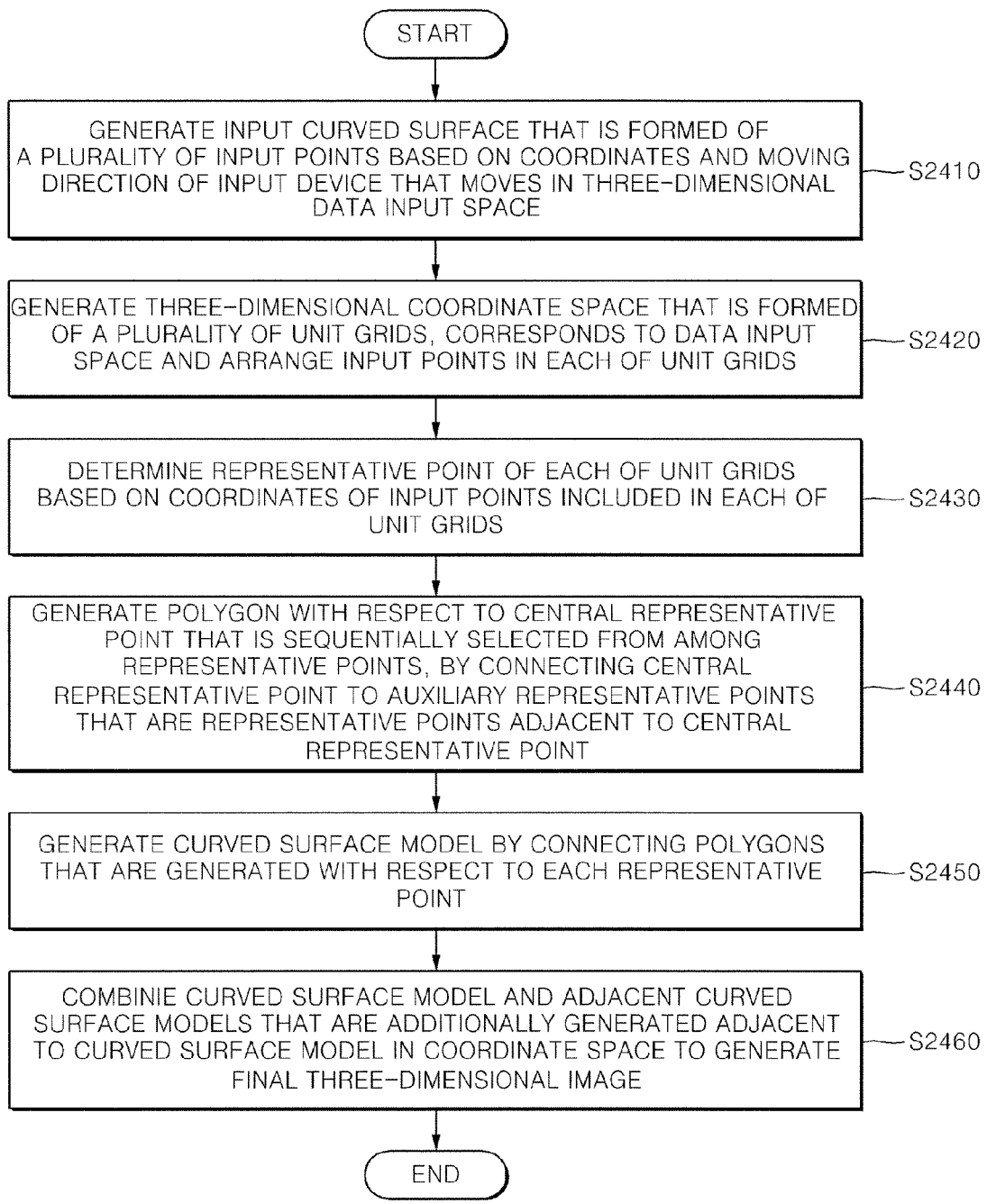
FIG. 24 is a flowchart illustrating a three-dimensional modeling method using a grid structure according to an embodiment of the present invention.

FIG. 24 is a flowchart illustrating a three-dimensional modeling method using a grid structure according to an embodiment of the present invention. Referring to FIG. 24, in Operation S2410, the input curved surface generating unit 110 generates a plurality of input curved surfaces each of those is formed of a plurality of input points based on the coordinates and the moving direction of an input device that moves in a three-dimensional data input space. Next, in Operation S2420, the input point arrangement unit 120 generates a three-dimensional coordinate space that is formed of a plurality of unit grids, corresponds to the data input space and arranges the input points in each of the unit grids. In Operation S2430, the representative point determining unit 130 determines a representative point of each of the unit grids based on coordinates of the input points included in each of the unit grids and generates a group of representative points with respect to each of the input curved surfaces.

In Operation S2440, the polygon generating unit 140 generates polygon with respect to a central representative point that is sequentially selected from among representative points, by connecting the selected central representative point to auxiliary representative points that are representative points adjacent to the selected central representative point. In this case, the polygon generating unit 140 generate polygon by referring to the storage unit 150 in which sample patterns that are polygonal patterns generated by connecting representative points determined from a unit grid located in each vertex of a hexahedral grid block in which adjacent unit grids are set to each vertex in the coordinate space are stored according to positions and number of the representative points. That is, the polygon generating unit 140 generates polygon with respect to the central representative point by combining the sample patterns that are identical with the positions and number of the central representative point and the auxiliary representative points, from among the sample patterns stored in the storage unit 150 with respect to the grid block in which a unit grid corresponding to the central representative point is set to one vertex. Also, the positions and number of the representative points may be adjusted on the grid block to be identical with those of the sample patterns stored in the storage unit 150.

In Operation S2450, the curved surface model generating unit 160 generates a curved surface model with respect to each of the groups of representative points by connecting polygons that are generated with respect to each representative point, and in Operation S2460, the curved surface model combining unit 180 combines the curved surface models and adjacent curved surface models that are additionally generated adjacent to the curved surface models in the coordinate space to generate a final three-dimensional image. When the curved surface models cross the adjacent curved surface models, the contour generating unit 170 generates the outermost contour by connecting representative points that are located in outermost circumferential portions of the curved surface models, and the curved surface model generating unit 180 combines a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

In order to generate a three-dimensional image, as described above, a plurality of curved surface models are needed, and to this end, a plurality of input curved surfaces need to be generated. An operation of determining a representative point of each of unit grids, generating polygon and generating a curved surface model may be performed in real-time whenever a user generates an input curved surface by moving the input device. Thus, the user may generate a three-dimensional image in a desired form by checking the generated curved surface model in real-time.

Figure 25A:
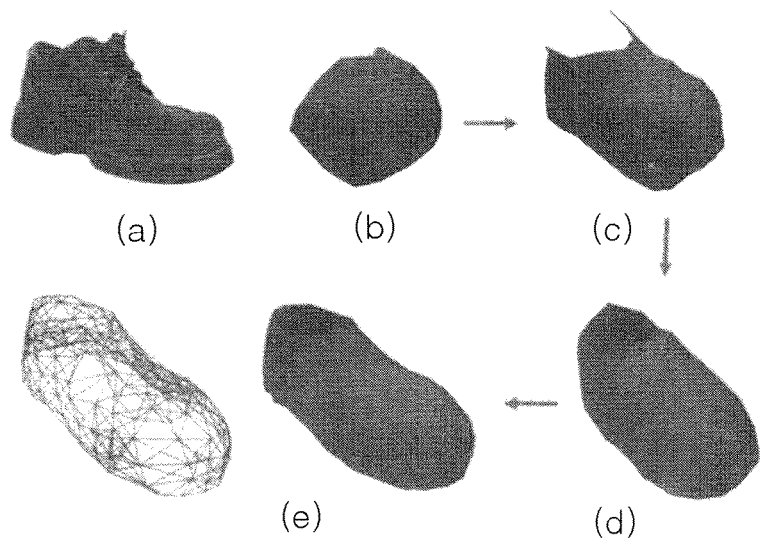
FIGS. 25A and 25B illustrate examples of three-dimensional images that are formed by the three-dimensional modeling apparatus of FIG. 1 and the three-dimensional modeling method of FIG. 24.
Figure 25B:
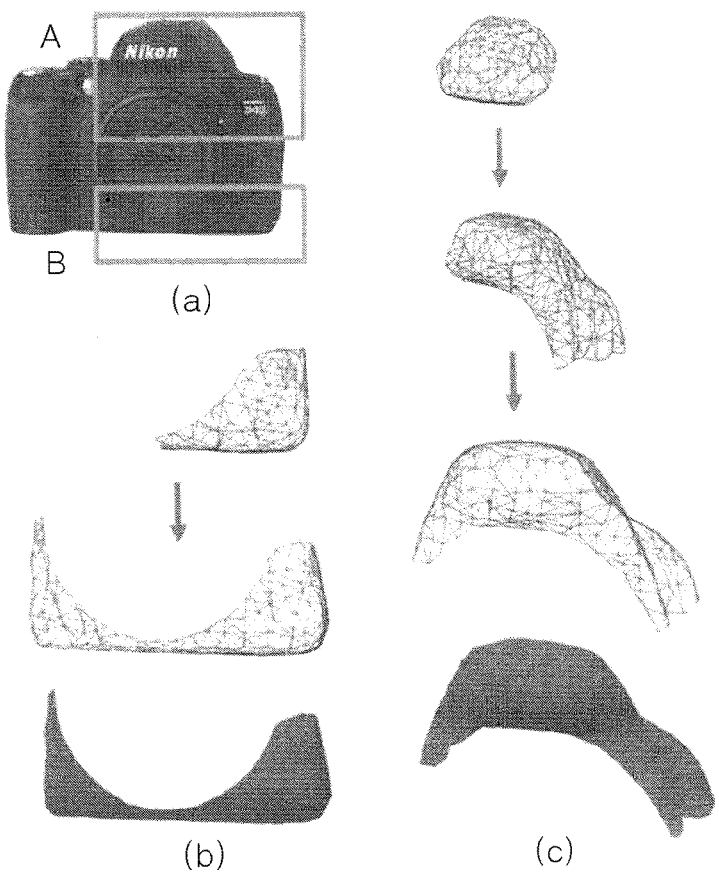

FIGS. 25A and 25B illustrate examples of three-dimensional images that are formed by the three-dimensional modeling apparatus of FIG. 1 and the three-dimensional modeling method of FIG. 24. Referring to FIG. 25A, in order to generate the shape of a shoe shown in (a), operations of (b) through (e) of FIG. 25A are performed. A three-dimensional image shown in (e) of FIG. 25A is obtained by combining a plurality of curved surface models, and a similar shape to (a) is generated. Referring to FIG. 25B, portion A of a camera of (a) may be modeled, as illustrated in (b) of FIG. 25B, and portion B of the camera of (b) may be modeled, as illustrated in (c) of FIG. 25B. A three-dimensional image that is similar to the shape of an actual object may be generated in both portions A and B.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, in the three-dimensional modelling apparatus and method using the grid structure according to the present invention, a three-dimensional image is generated by combining a plurality of curved surface models so that the three-dimensional image that is similar to the shape of an actual object to be modeled may be easily generated. Also, a curved surface model is generated based on a representative point of each of unit grids in a three-dimensional coordinate space that is formed of a plurality of unit grids, and previously-stored sample patterns are combined when polygon that is a basic unit of a curved surface model is generated, so that the amount of calculation required for generating the curved surface model may be reduced and the speed of three-dimensional modeling may be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three-dimensional modeling apparatus comprising:
an input curved surface generating unit generating a plurality of input curved surfaces each of those is formed of a plurality of input points based on coordinates and a moving direction of an input device that moves in three-dimensional data input space;
an input point arrangement unit generating three-dimensional coordinate space that corresponds to the data input space and is formed of a plurality of unit grids, and arranging the input points in each of the unit grids;
a representative point determining unit determining a representative point of each of the unit grids based on coordinates of the input points included in each of the unit grids and generating a group of representative points with respect to each of the input curved surfaces;
a polygon generating unit selecting a representative point sequentially from representative points as a central representative point and generating polygon sequentially with respect to the selected central representative point by connecting the selected central representative point to auxiliary representative points that are representative points adjacent to the selected central representative point;
a curved surface model generating unit generating a curved surface model with respect to each of the groups of representative points by connecting polygons that are generated with respect to the respective representative points; and
a curved surface model combining unit combining the curved surface models and adjacent curved surface models that are additionally generated to be adjacent to the curved surface models in the coordinate space to generate a final three-dimensional image.

2. The apparatus of claim 1, wherein, when the input points that constitute different input curved surfaces are located in the same unit grid, the representative point determining unit determines a point in a line in which the representative points determined from the input points that constitute each input curved surface are connected to each other, as a representative point of the unit grid.

3. The apparatus of claim 1, wherein, when the input points that constitute different input curved surfaces are located in the same unit grid, the representative point determining unit determines a point in an area that involves a boundary line and an inside of a diagram formed by the line in which the representative points determined from the input points that constitute each input curved surface are connected to each other, as a representative point of the unit grid.

4. The apparatus of claim 1, further comprising a contour generating unit generating an outermost contour by connecting representative points that are located in outermost circumferential portions of the curved surface models, wherein, when the curved surface models cross the adjacent curved surface models, the curved surface model combining unit combines a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

5. The apparatus of claim 2, further comprising a contour generating unit generating an outermost contour by connecting representative points that are located in outermost circumferential portions of the curved surface models, wherein, when the curved surface models cross the adjacent curved surface models, the curved surface model combining unit combines a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

6. The apparatus of claim 1, wherein the representative point determining unit determines an average of coordinate values of the input points included in the unit grid as a coordinate value of the representative point.

7. The apparatus of claim 1, further comprising a storage unit in which sample patterns that are polygonal patterns generated by connecting representative points determined from a unit grid located in each vertex of a hexahedral grid block in which adjacent unit grids are set to each vertex in the coordinate space, according to positions and number of the representative points, wherein the polygon generating unit generates polygon with respect to the central representative point by combining the sample patterns of which positions and number are identical with the positions and number of the central representative point and the auxiliary representative points, from among the sample patterns stored in the storage unit with respect to the grid block in which a unit grid corresponding to the central representative point is set to one vertex.

8. The apparatus of claim 2, further comprising a storage unit in which sample patterns that are polygonal patterns generated by connecting representative points determined from a unit grid located in each vertex of a hexahedral grid block in which adjacent unit grids are set to each vertex in the coordinate space, according to positions and number of the representative points, wherein the polygon generating unit generates polygon with respect to the central representative point by combining the sample patterns of which positions and number are identical with the positions and number of the central representative point and the auxiliary representative points, from among the sample patterns stored in the storage unit with respect to the grid block in which a unit grid corresponding to the central representative point is set to one vertex.

9. The apparatus of claim 7, wherein, when sample patterns that are identical with positions and number of the central representative point and auxiliary representative points are not present in the sample patterns stored in the storage unit, the polygon generating unit eliminates at least one from the auxiliary representative points on the grid block or moves the positions of the auxiliary representative points so that the positions of the auxiliary representative points are identical with one from among the sample patterns stored in the storage unit.

10. The apparatus of claim 1, wherein the representative point determining unit eliminates representative points that are determined in a different position from the moving direction of the input device in the coordinate space.

11. A three-dimensional modeling method comprising:
generating a plurality of input curved surfaces each of those is formed of a plurality of input points based on coordinates and a moving direction of an input device that moves in three-dimensional data input space;
generating three-dimensional coordinate space that corresponds to the data input space and is formed of a plurality of unit grids, and arranging the input points in each of the unit grids;
determining a representative point of each of the unit grids based on coordinates of the input points included in each of the unit grids and generating a group of representative points with respect to each of the input curved surfaces;
selecting a representative point sequentially from representative points as a central representative point and generating polygon sequentially with respect to the selected central representative point by connecting the selected central representative point to auxiliary representative points that are representative points adjacent to the selected central representative point;
generating a curved surface model with respect to each of the groups of representative points by connecting polygons that are generated with respect to the respective representative points; and
combining the curved surface models and adjacent curved surface models that are additionally generated to be adjacent to the curved surface models in the coordinate space to generate a final three-dimensional image.

12. The method of claim 11, wherein, when the input points that constitute different input curved surfaces are located in the same unit grid, the determining of the representative point comprises determining a point in a line in which the representative points determined from the input points that constitute each input curved surface are connected to each other, as a representative point of the unit grid.

13. The method of claim 11, further comprising generating an outermost contour by connecting representative points that are located in outermost circumferential portions of the curved surface models, wherein, when the curved surface models cross the adjacent curved surface models, the combining of the curved surface models comprises combining a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

14. The method of claim 12, further comprising generating an outermost contour by connecting representative points that are located in outermost circumferential portions of the curved surface models, wherein, when the curved surface models cross the adjacent curved surface models, the combining of the curved surface models comprises combining a partial curved surface model having the outermost contour of the greatest length with the adjacent curved surface models, from among the plurality of partial curved surface models that are generated to be divided by a straight line in which cross-points of the curved surface models and the adjacent curved surface models are connected to each other.

15. The method of claim 11, wherein the determining of the representative point comprises determines an average of coordinate values of the input points included in the unit grid as a coordinate value of the representative point.

16. The method of claim 11, wherein, by referring to a storage unit in which sample patterns that are polygonal patterns generated by connecting representative points determined from a unit grid located in each vertex of a hexahedral grid block in which adjacent unit grids are set to each vertex in the coordinate space, according to positions and number of the representative points, the generating of the polygon comprises generating polygon with respect to the central representative point by combining the sample patterns of which positions and number are identical with the positions and number of the central representative point and the auxiliary representative points, from among the sample patterns stored in the storage unit with respect to the grid block in which a unit grid corresponding to the central representative point is set to one vertex.

17. The method of claim 12, wherein, by referring to a storage unit in which sample patterns that are polygonal patterns generated by connecting representative points determined from a unit grid located in each vertex of a hexahedral grid block in which adjacent unit grids are set to each vertex in the coordinate space, according to positions and number of the representative points, the generating of the polygon comprises generating polygon with respect to the central representative point by combining the sample patterns of which positions and number are identical with the positions and number of the central representative point and the auxiliary representative points, from among the sample patterns stored in the storage unit with respect to the grid block in which a unit grid corresponding to the central representative point is set to one vertex.

18. The method of claim 16, wherein, when sample patterns that are identical with positions and number of the central representative point and auxiliary representative points are not present in the sample patterns stored in the storage unit, the generating of the polygon comprises eliminating at least one from the auxiliary representative points on the grid block or moves the positions of the auxiliary representative points so that the positions of the auxiliary representative points are identical with one from among the sample patterns stored in the storage unit.

19. A non-transitory computer readable recording medium having a program recorded thereon for executing a three-dimensional modeling method according to claim 11 on a computer.

20. A three-dimensional modeling apparatus comprising:
an input curved surface generating unit generating a plurality of input curved surfaces each of those is formed of a plurality of input points based on coordinates and a moving direction of an input device that moves in three-dimensional data input space;
an input point arrangement unit generating three-dimensional coordinate space that corresponds to the data input space and is formed of a plurality of unit grids, and arranging the input points in each of the unit grids;
a representative point determining unit determining a representative point of each of the unit grids based on coordinates of the input points included in each of the unit grids and generating a group of representative points with respect to each of the input curved surfaces;
a polygon generating unit selecting a representative point sequentially from representative points as a central representative point and generating polygon sequentially with respect to the selected central representative point by connecting the selected central representative point to auxiliary representative points that are representative points adjacent to the selected central representative point;
a curved surface model generating unit generating a curved surface model with respect to each of the groups of representative points by connecting polygons that are generated with respect to the respective representative points;
a curved surface model combining unit combining the curved surface models and adjacent curved surface models that are additionally generated to be adjacent to the curved surface models in the coordinate space to generate a final three-dimensional image; and
a storage unit in which sample patterns that are polygonal patterns generated by connecting representative points determined from a unit grid located in each vertex of a hexahedral grid block in which adjacent unit grids are set to each vertex in the coordinate space, according to positions and number of the representative points, wherein the polygon generating unit generates polygon with respect to the central representative point by combining the sample patterns of which positions and number are identical with the positions and number of the central representative point and the auxiliary representative points, from among the sample patterns stored in the storage unit with respect to the grid block in which a unit grid corresponding to the central representative point is set to one vertex; wherein, when sample patterns that are identical with positions and number of the central representative point and auxiliary representative points are not present in the sample patterns stored in the storage unit, the polygon generating unit eliminates at least one from the auxiliary representative points on the grid block or moves the positions of the auxiliary representative points so that the positions of the auxiliary representative points are identical with one from among the sample patterns stored in the storage unit.

* * * * *